US011454960B2

(12) United States Patent
Lutz

(10) Patent No.: US 11,454,960 B2
(45) Date of Patent: Sep. 27, 2022

(54) METHOD AND CONTROL SYSTEM FOR A TECHNICAL INSTALLATION WITH TREND CURVE DIAGRAM

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 29 days.

(21) Appl. No.: 17/094,345

(22) Filed: Nov. 10, 2020

(65) Prior Publication Data

US 2021/0141367 A1 May 13, 2021

(30) Foreign Application Priority Data

Nov. 11, 2019 (EP) .................................... 19208323

(51) Int. Cl.
*G06F 9/44* (2018.01)
*G06F 8/60* (2018.01)
(Continued)

(52) U.S. Cl.
CPC ... *G05B 19/41885* (2013.01); *G05B 19/4183* (2013.01); *G06F 8/65* (2013.01); *G06F 17/18* (2013.01)

(58) Field of Classification Search
CPC ........ A61N 1/3627; G06T 7/11; G16H 30/40; G16H 40/63; A61B 5/0022; A61B 5/0205;
(Continued)

(56) References Cited

U.S. PATENT DOCUMENTS 6,484,133 B1 11/2002 Vogt
6,885,907 B1 4/2005 Zhang et al.
(Continued)

FOREIGN PATENT DOCUMENTS

EP 3082082 10/2016

OTHER PUBLICATIONS

Radia et al., Next-Generation Applications on Cellular Networks: Trends, Challenges, and Solutions, 14 pages (Year: 2012).*
(Continued)

*Primary Examiner* — Thuy Dao
(74) *Attorney, Agent, or Firm* — Cozen O'Connor

(57) ABSTRACT

A computer-implemented method for representing operator control information in the context of a technical installation which includes at least one operator station server and one operator station client, wherein the method includes receiving measurement values of at least one technical object of the technical installation via the operator station server, continuously generating an actual trend progression of the measurement value, in the event that no measurement value can be received from the at least one technical object, an interpolation of the measurement value being undertaken to generate an interpolated trend progression, until a measurement value can be received once again, transferring the actual and the interpolated trend progression from the operator station server to the operator station client, and visually presenting the actual and the interpolated trend progression to an operator of the technical installation, preferably in a common trend progression diagram.

10 Claims, 6 Drawing Sheets

(51) Int. Cl.
*G06F 9/445* (2018.01)
*G05B 19/418* (2006.01)
*G06F 8/65* (2018.01)
*G06F 17/18* (2006.01)

(58) Field of Classification Search
CPC ............ A61B 5/021; A61B 5/7275; G05B 19/41885; G05B 19/4183; G06F 8/65; G06F 17/18; G06F 8/60; G06F 9/452; G06F 9/451; F01D 21/003; G06Q 30/0601; G01D 11/245
See application file for complete search history.

(56) References Cited

U.S. PATENT DOCUMENTS

| | | | |
|---|---|---|---|
| 10,962,361 B2 * | 3/2021 | Iseli | G06T 1/0014 |
| 11,144,302 B2 * | 10/2021 | Arakkal | G06N 3/08 |
| 2016/0305848 A1 | 10/2016 | Boggio | |

OTHER PUBLICATIONS

EP Search Report dated Apr. 30, 2020 based on EP19208323 filed Nov. 11, 2019.

* cited by examiner

METHOD AND CONTROL SYSTEM FOR A TECHNICAL INSTALLATION WITH TREND CURVE DIAGRAM

BACKGROUND OF THE INVENTION

1. Field of the Invention

The invention relates to a computer-implemented method as claimed in claim 1 and a control system for a technical installation with trend curve diagram.

2. Description of the Related Art

In an event-oriented transfer, process values are transferred from an automation station into an operator station server, either due to a sufficiently large change or on expiration of a particular allotted time (timeout). Both the change identification and the timeout can thus be configured such that, under some circumstances, process values are only very rarely updated in the process image of the operator station server. This has a direct influence on the process-related trend curves which are important for the operator control and monitoring and show the progression of a process value over time. Only in the case of regular ("cyclic") updating can a continuous advancing of the trend curve be ensured.

The basis of a reliable operator control and monitoring by an operator therefore depends upon the temporal interval since the last update to the trend curves, as the operator has to work with "old values" between two updates. In the case of telecontrol systems, the update rates are also considerably lower, as it is not each changed process value, but rather entire packets of changed process values, which are transferred and retroactively written into the process image of the operator station server with old time stamps.

There is similar behavior in the case of short-term connection failures: once the failed connection has been reestablished, the built-up process data intended for transfer is transferred as a packet and is retroactively written into the process image. In the case of a failure of a measuring point, no updates are available for diverting an operator control until rectification—the operator has to operate the installation "flying blind" in the meantime.

SUMMARY OF THE INVENTION

It is an object of the invention to provide a computer-implemented method for representing operator control information for a technical installation, which increases safety of the operator control of the technical installation.

This and other objects and advantages are achieved in accordance with the invention by a computer-implemented method for representing operator control information in the context of a technical installation having at least one operator station server and one operator station client. In accordance with the invention, the method includes a) receiving measurement values of at least one technical object of the technical installation via the operator station server, b) continuously generating an actual trend progression of the measurement value, where an interpolation of the measurement value is undertaken to generate an interpolated trend progression, until a measurement value can be received once again, in the event that no measurement value can be received from the at least one technical object, c) transferring the actual and the interpolated trend curve from the operator station server to the operator station client, and d) visually presenting the actual and the interpolated trend progression to an operator of the technical installation, preferably in a common trend progression diagram.

The technical installation can be an installation from the process industry, such as a chemical, pharmaceutical or petrochemical installation, or an installation from the food and beverage industry. This also encompasses any installations from the production industry, factories, in which, for example, automobiles or goods of all kinds are produced. Technical installations that are suitable for implementing the method in accordance with the invention can also come from the power generation sector. The term "technical installation" also encompasses wind turbines, solar installations or power generation plants.

Each of the foregoing installations have a control system or at least a computer-aided module for open-loop and closed-loop control of the executing process or production. In the present context, a control system is understood to mean a computer-aided technical system, which comprises functionalities for representing, operating and controlling a technical system, such as a manufacturing or production installation. Here, the control system comprises sensors for determining measurement values, as well as various actuators. Additionally, the control system comprises what are known as process-oriented components, which serve to activate the actuators or sensors. Furthermore, the control system has inter alia means for visualizing the process installation and for engineering. The term control system is additionally intended to also encompass further computer units for more complex closed-loop controls and systems for data storage and data processing.

In the present context, an "operator station server" is understood to mean a server that centrally captures data of an operator control and monitoring system and generally also alarm and measurement value archives of a control system of a technical installation, and makes this data available to users (known as operators). The operator station server generally establishes a communication connection to automation systems of the technical installation and forwards data of the technical installation to what is known as the operator station client, where the data serves the purpose of operator control and monitoring of an operation of the individual functional elements of the technical installation. The operator station server can be a SIMATIC PCS 7 industrial workstation server from SIEMENS, without being restricted to this.

The operator station client associated with the operator station server can have access to the data (archives, messages, tags, variables) of the operator station server and can visually represent images of an operation of the technical installation on a display device suitable for this purpose. It additionally possesses input means, which serve the operator control of the technical installation by an operator.

An operator is understood to mean a human user of the technical installation. The operator interacts with the technical installation or the control system thereof by means of specific user interfaces (for example, via the operator station client) and controls specific technical functions of the technical installation.

A technical object is understood to mean a self-contained technical unit, which can be integrated into a higher-level control level. One such technical object may be, for example, an amalgamation of a plurality of measuring points or a larger installation part of an industrial installation. The technical object does not have to originate from the field of industrial installations, however, but rather may also be a motor module of an automotive, a ship or the like, for example.

In a manner known per se, the operator station server receives measurement values from at least one technical object of the technical installation, such as a temperature sensor. The operator station server uses these measurement values to generate a trend progression and to visually present this to the operator via the operator station client for the purpose of operator control and monitoring. In this context, in contrast with the interpolated trend progression explained in the following, this involves an actual trend progression, i.e., the trend progression is based on measurement values which are in fact measured.

If an update of the measurement value does not happen, i.e., the operator station server is not able to receive measurement values for various reasons, then an interpolation of the measurement value is performed by the operator station server. Although no "true" measurement values are present, the operator is shown an "estimated" progression, which is identified as such and on the basis of which possible operator controls can be derived. The interpolation can be initiated, for example, via a particular trigger (e.g., measurement value was no longer updated beyond a particular period of time). If the prerequisite for an interpolation is no longer met, e.g., because the measurement value returns to being updated continuously within a timeout, then the interpolation ends again.

The presentation of the trend progressions may be restricted to trend progression diagrams actively selected by the operator in the context of the operator control and monitoring. This means that for measurement values, where the technical objects associated therewith have no importance to the operator at present and therefore have not been actively selected by said operator in the operator station client for operator control and monitoring, no trend progressions are ascertained (and the conclusion is also that no interpolated substitute values are calculated). This leads to a considerable reduction in the necessary resources, because the described restriction of the ascertaining of the trend progressions means that calculations do not have to be constantly performed for each individual measurement value of the technical installation (which in practice may mean a very large number).

In a preferred embodiment of the invention, in the event that the actual measurement values of at least one technical object, which have occurred during a period of time of the presentation of the interpolated trend progression, can be received from the operator station server retrospectively, then the actual measurement values from the operator station server can be used to generate the actual trend progression of the measurement value and a comparison of the interpolated and the actual trend progression is transferred to the operator station client for visual presentation to the operator of the technical installation. If measurement values from the period of time during which an interpolation occurred are thus subsequently received from the operator station server, then these are also retroactively integrated into the trend progression presented to the operator, in parallel with the interpolated measurement values already present. Based on the difference between the two progressions (actual and interpolated), the operator can identify whether it is necessary to have to correct an operator control action undertaken based on interpolated measurement values, or whether his operator control actions still have validity.

Preferably, the interpolated trend progression is stored in an archive of a control system of the technical installation, together with the actual trend progression. An operator can make an operator control decision based on an interpolated measurement value. Consequently, these are archived for later traceability.

The previously mentioned interpolation of the measurement values may take place on the basis of historical measurement values. To this end, a mathematical method can be used, such as a polynomial interpolation.

Alternatively, the interpolation of the measurement values may also occurs because measurement values of at least a second technical object of the technical installation are taken into account. This method is known under the term "soft sensors", for example. Here, for example, a pressure value, which cannot be measured directly, is interpolated via variables associated with the pressure value, such as temperature or flow rate.

It is also an object of the invention to provide a control system (having a processor and memory) of a technical installation, in particular a manufacturing installation or process installation, which is configured to implement in accordance with the disclosed embodiments of the method of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now become clearer and more intelligible in conjunction with the following description of the exemplary embodiment, which will be explained in detail making reference to the drawings, in which.

DETAILED DESCRIPTION OF THE EXEMPLARY EMBODIMENTS

Figure 1:
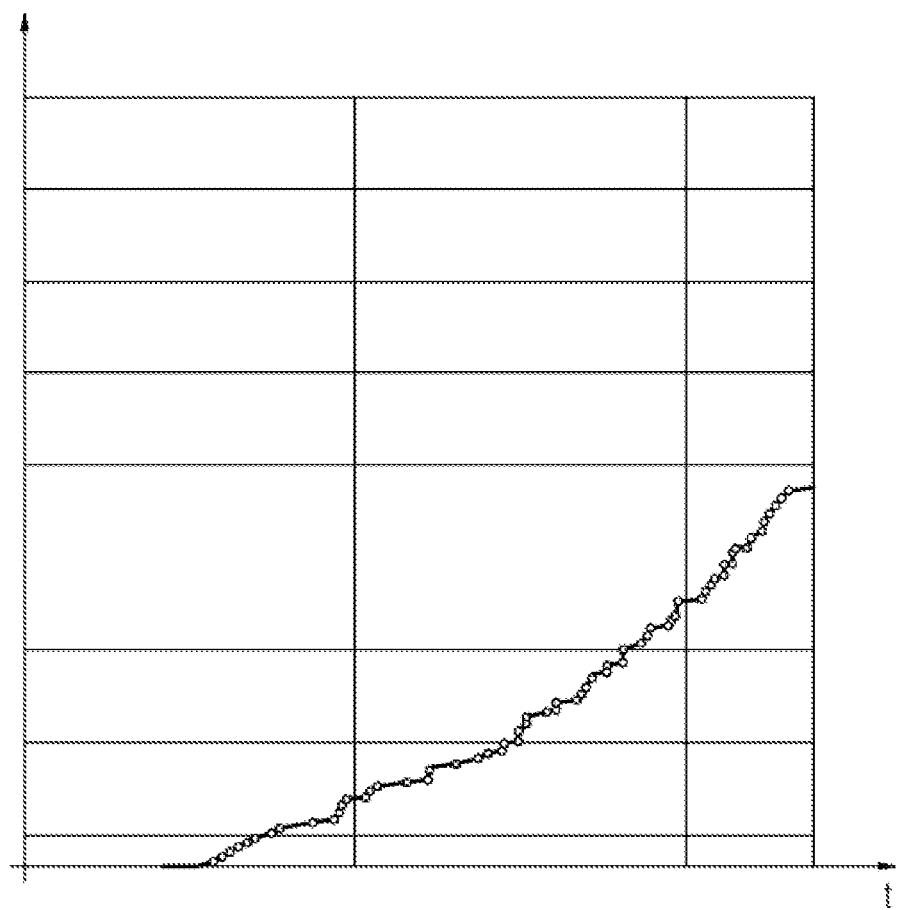
FIG. 1 shows a graphical plot of a trend progression with actual measurement values in accordance with the invention.

FIG. 1 shows a graphical plot of an exemplary trend progression of an arbitrary measurement value of a technical installation embodied as a process installation. A temporal progression of the measurement value is shown in this context. The trend curve shows the current progression of a measurement value, i.e., the time axis is shifted continuously.

Figure 2:
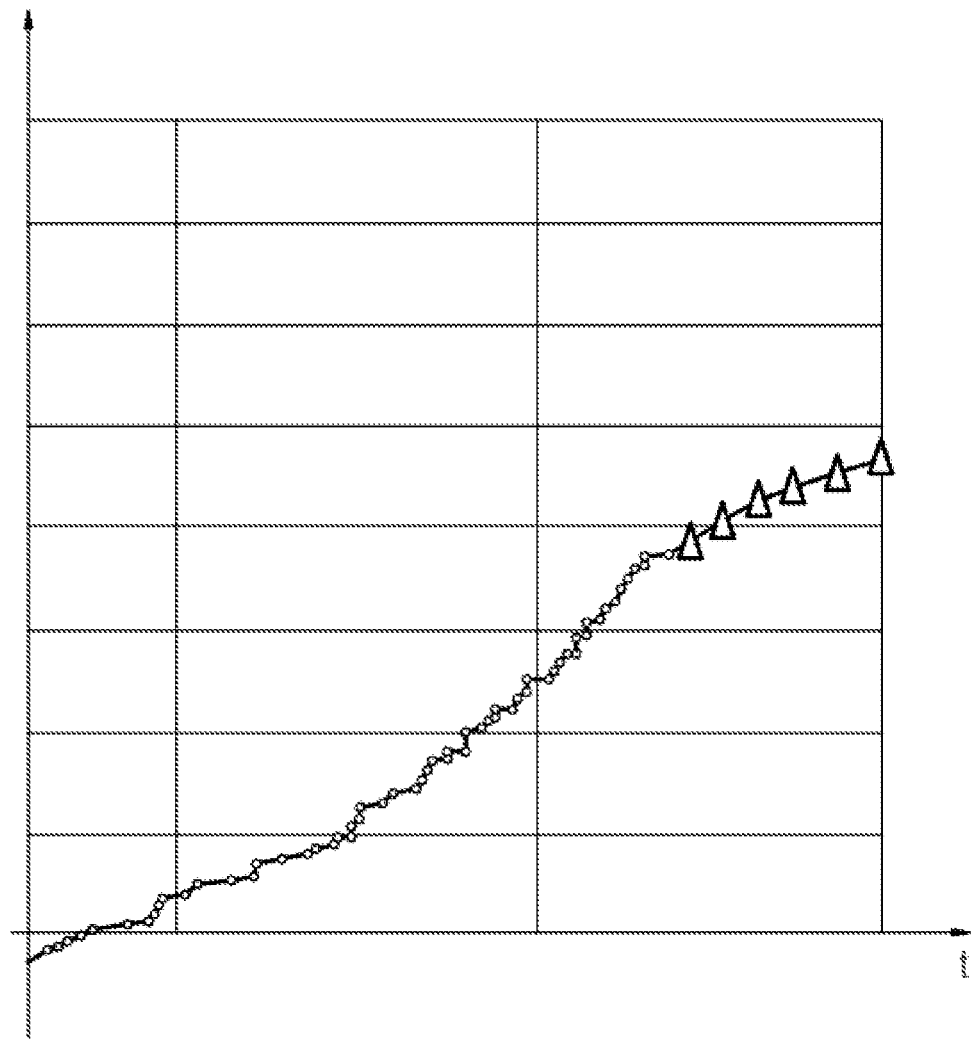
FIG. 2 shows a graphical plot of a trend progression with interpolated measurement values in accordance with the invention.

In FIG. 2, a right part of the progression curve is marked by triangle symbols, which means that the measurement values here do not represent actual (measured) values, but rather interpolated (approximated and thus not in fact measured) values. The operator is given information that the displayed measurement values involve interpolated values. By way of the dynamic interpolation, however, in contrast with a failure of the trend curve, a continuous shifting of the trend curve can be ensured. The measuring points calculated by the interpolation are written back into a process image 11 (as explained later), such that these can be archived and can also be represented once more when the trend progression is re-opened.

Figure 3:
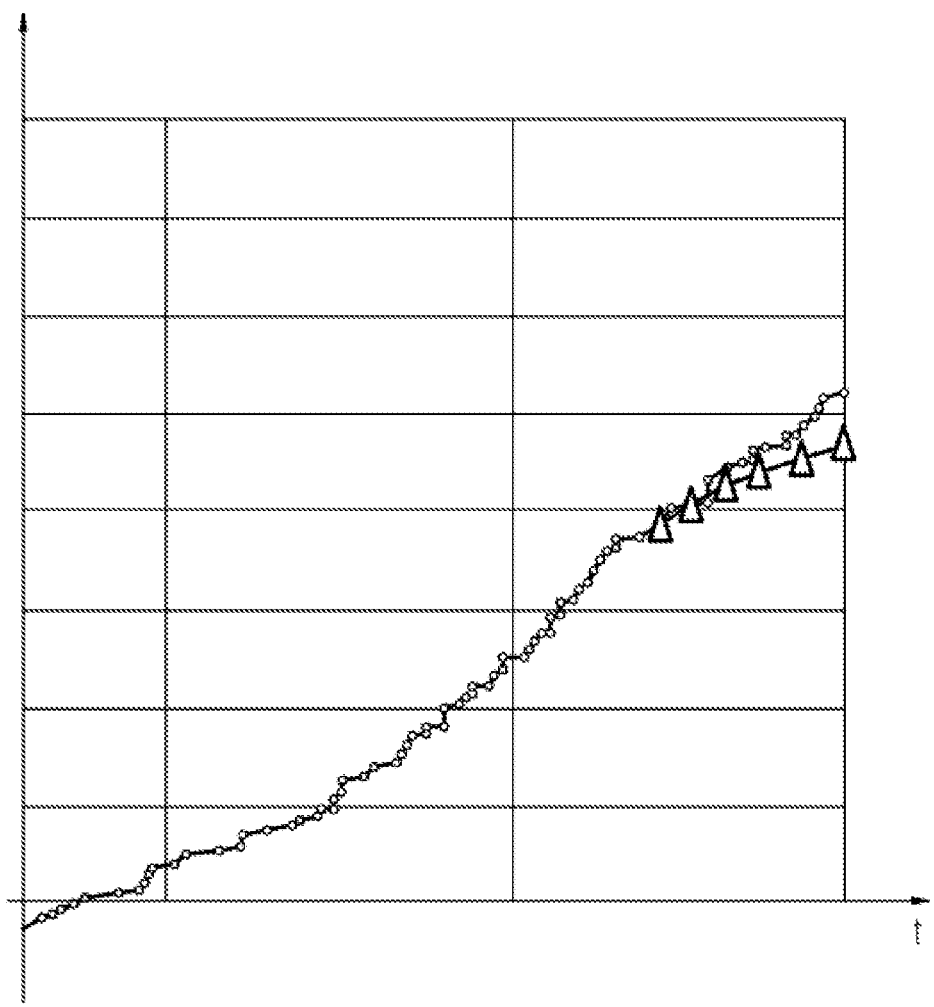
FIG. 3 shows a graphical plot of a trend progression with actual and interpolated measurement values in accordance with the invention.

If, as described in the introduction, updates to measurement values with a time stamp in the past now arrive, then these are also retroactively entered into the trend progression, in parallel with the interpolated measurement values already present. This juxtaposition of interpolated and actual measurement values can be identified in FIG. 3, where the subsequently inserted actual trend progression of the measurement values is situated slightly above the interpolated measurement values. It is therefore also possible to understand that an interpolation has been used in a bridging manner for the present measurement value due to update difficulties in a historical view of a trend curve. Based on the difference between the two curves, the operator can identify whether it is necessary to amend an operator control undertaken based on interpolated measurement values, or whether this operator control still has validity.

Figure 4:
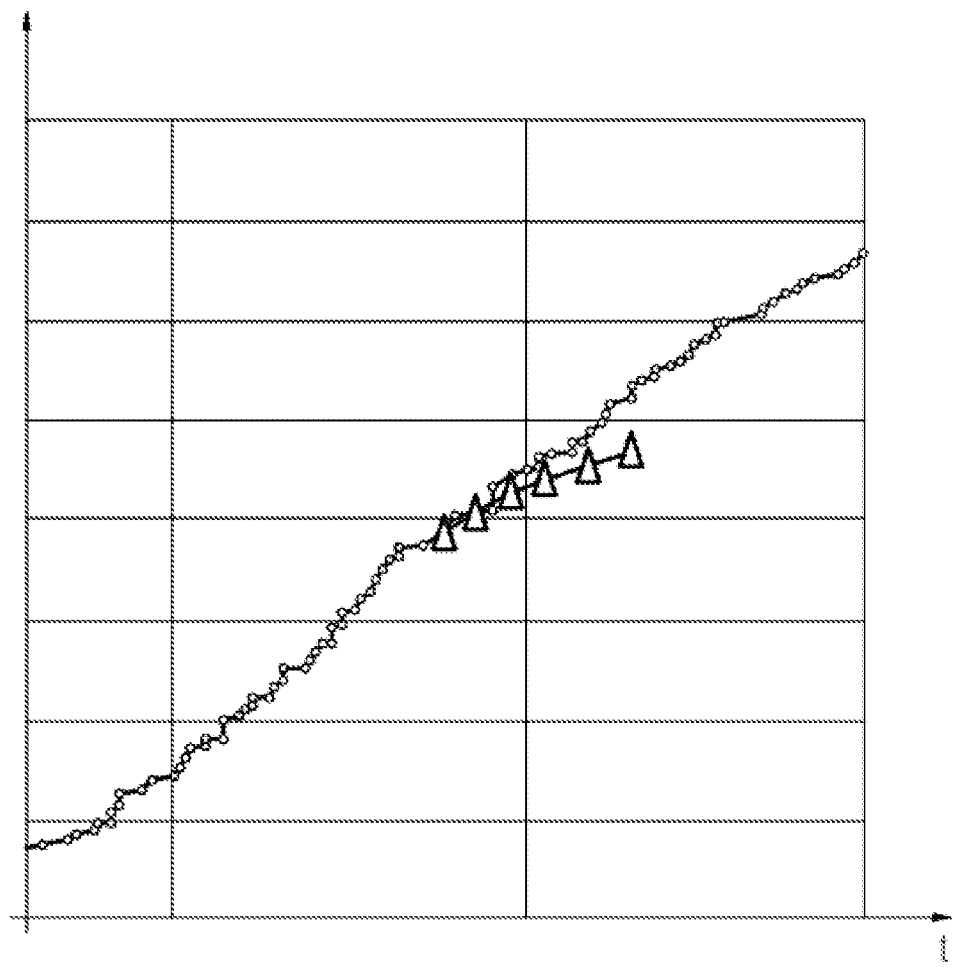
FIG. 4 shows a graphical plot of the trend progression of FIG. 3 in accordance with a second embodiment of the invention.

If the prerequisite for an interpolation is no longer met, e.g., because the measurement value returns to being updated continuously within a timeout, then the interpolation ends immediately, which is shown in FIG. 4.

Figure 5:
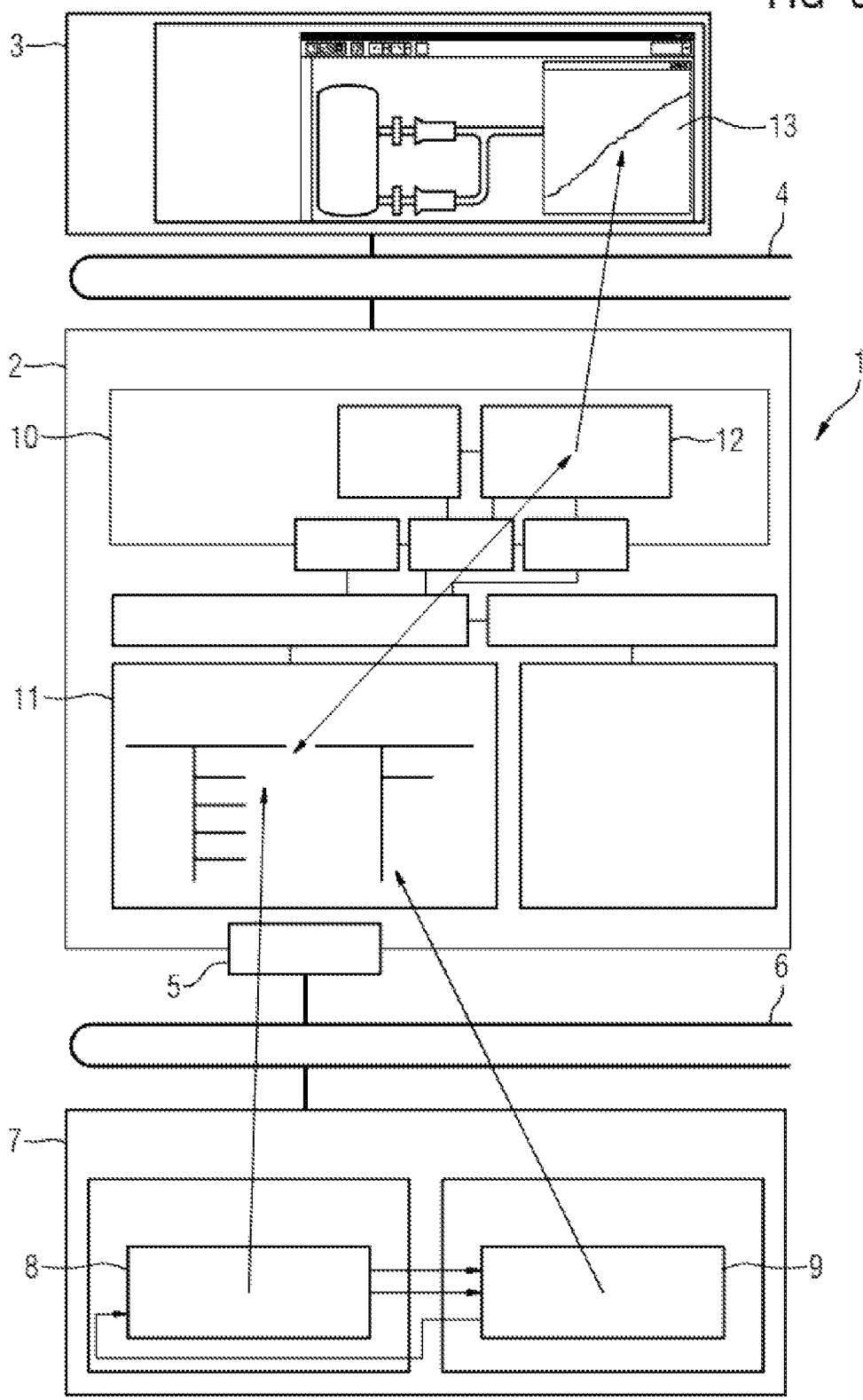
FIG. 5 shows an architecture of a control system of a technical installation.

FIG. 5 shows a part of a control system 1 of a process installation in accordance with the invention. The control system 1 comprises a server of an operator control system or an operator station server 2 and an operator station client 3 associated therewith. The operator station server 2 and the operator station client 3 are interconnected via a terminal bus 4 and are connected to further components (not shown) of the control system 1, such as an engineering system server or a process data archive.

A user or operator has access to the operator station server 2 via the operator station client 3 over the terminal bus 4, in the context of operator control and monitoring. The terminal bus 4 can be configured, without being limited thereto, as an industrial Ethernet, for instance.

The operator station server 2 has a device interface 5, which is connected to an installation bus 6. This can be used by the operator system server 2 to communicate with an automation device 7 of the control system 1. The installation bus 6 can be configured, without being limited thereto, as an industrial Ethernet, for instance. The automation device 7 has a connection to a first technical object 8 and to a second technical object 9.

Integrated into the operator station server 2 is a visualization service 10, via which a transmission of (visualization) data to the operator station client 3 can occur. Additionally, the operator station server 2 has a process image 11 of the process installation.

In normal operating mode, the operator station server 2 receives measurement values from the first technical object 8 via the automation device 7. The measurement values are stored in the process image 11 of the operator station server 2. A trend component 12, which represents a part of the visualization service 10, reads the measurement values from the process image 11, generates a trend progression (with the actual, measured measurement values) therefrom and transmits the trend progression to the operator station client 3, which presents the trend progression in the form of a trend progression diagram 13 to an operator of the technical installation.

The trend component 12, however, also implements the previously described interpolation functions, which come into effect in the absence of updates to measurement values. Here, mathematical methods based on historical measurement values of the first technical object 8 can be used. The interpolation, however, may also occur via indirect measuring methods ("soft sensors"), taking into account the second technical object 9 (as explained in the general description part). The trend component 12 can both output the interpolated updates in the trend curve diagram 13 opened by the operator 13 and store the interpolated updates in an archive (not shown) of the control system 1 via the process image 11 of the operator station server 2.

Figure 6:
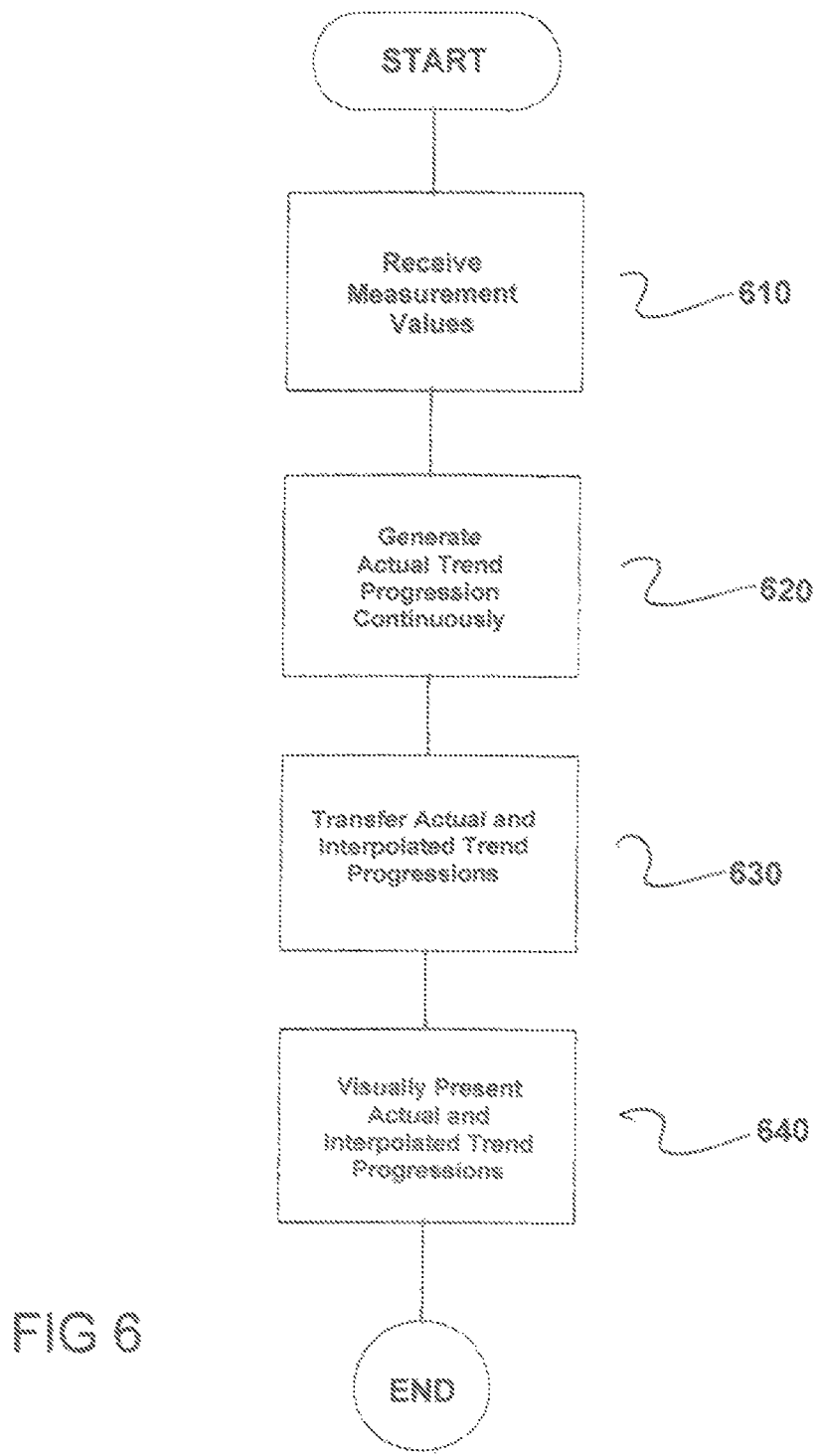
FIG. 6 is a flowchart of the method in accordance with the invention.

FIG. 6 is a flowchart of a computer-implemented method for representing operator control information in the context of a technical installation having at least one operator station server 2 and one operator station client 3.

The method comprises receiving measurement values of at least one technical object 8, 9 of the technical installation via the at least one operator station server, as indicated in step 610.

Next, an actual trend progression of a received measurement value is continuously generated, as indicated in step 620. In accordance with the invention, in the event that a measurement value is not received from the at least one technical object 8, 9, an interpolation of the measurement value is undertaken to generate an interpolated trend progression, until a measurement value is again receivable.

Next, the actual and the interpolated trend progression from the at least one operator station server 2 is transferred to the at least one operator station client 3, as indicated in step 630. Next, the actual trend progression and an interpolated trend progression are visually presented to an operator of the technical installation, as indicated in step 640.

Although the invention has been illustrated and described in greater detail with the preferred exemplary embodiment and the figures, the invention is not restricted by the examples disclosed and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-implemented method for representing operator control information in a context of a technical installation having at least one operator station server and one operator station client, the method comprising:
   a) receiving measurement values of at least one technical object of the technical installation via the at least one operator station server;
   b) continuously generating an actual trend progression of a received measurement value,
      b1) in an event of no measurement value being received from the at least one technical object, an interpolation of the measurement value being undertaken to generate an interpolated trend progression, until a measurement value is again receivable;
      b2) in the event that the actual measurement values of at least one technical object, which have occurred during a period of time of the visual presentation of the interpolated trend progression, is receivable from the at least one operator station server retrospectively, then the relevant actual measurement values from the operator station server is utilizable to generate the actual trend progression of the measurement value and a comparison of the interpolated and the actual trend progression is transferred to the at least one operator station client for visual presentation to the operator of the technical installation;
   c) transferring the actual trend progression and an interpolated trend progression from the at least one operator station server to the at least one operator station client; and
   d) visually presenting the actual and the interpolated trend progression to an operator of the technical installation.

2. The computer-implemented method as claimed in claim 1, wherein the interpolated trend progression is stored in an archive of a control system of the technical installation, together with the actual trend progression.

3. The method as claimed in claim 2, wherein the interpolation occurs taking into account measurement values of at least a second technical object of the technical installation.

4. The computer-implemented method as claimed in claim 1, wherein the interpolated trend progression is stored in an archive of a control system of the technical installation, together with the actual trend progression.

5. The computer-implemented method as claimed in claim 1, wherein the interpolation occurs based on historical measurement values.

6. The method as claimed in claim 1, wherein the interpolation occurs taking into account measurement values of at least a second technical object of the technical installation.

7. The method as claimed in claim 1, wherein the actual and the interpolated trend progression are visually presented in a common trend progression diagram.

8. A control system of a technical installation, comprising:
   a processor; and
   memory;
   wherein the control system is configured to:
   a) receive measurement values of at least one technical object of the technical installation via the at least one operator station server;
   b) continuously generate an actual trend progression of a received measurement value, in an event of no measurement value being received from the at least one technical object, an interpolation of the measurement value being undertaken to generate an interpolated trend progression, until a measurement value is again receivable;
   c) transfer the actual trend progression and an interpolated trend progression from the at least one operator station server to the at least one operator station client; and
   d) visually present the actual and the interpolated trend progression to an operator of the technical installation.

9. The control system as claimed in claim 8, wherein the technical installation comprises one of a manufacturing installation or process installation.

10. The control system as claimed in claim 8, wherein the actual and the interpolated trend progression are visually presented in a common trend progression diagram.

* * * * *